(12) United States Patent
Al-Dahle et al.

(10) Patent No.: US 9,063,595 B2
(45) Date of Patent: Jun. 23, 2015

(54) DEVICES AND METHODS FOR REDUCING POWER USAGE OF A TOUCH-SENSITIVE DISPLAY

(75) Inventors: Ahmad Al-Dahle, Santa Clara, CA (US); Hopil Bae, Sunnyvale, CA (US); Wei H. Yao, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 365 days.

(21) Appl. No.: 13/603,169

(22) Filed: Sep. 4, 2012

(65) Prior Publication Data

US 2013/0328796 A1 Dec. 12, 2013

Related U.S. Application Data

(60) Provisional application No. 61/657,686, filed on Jun. 8, 2012.

(51) Int. Cl.
*G06F 3/041* (2006.01)

(52) U.S. Cl.
CPC .......... *G06F 3/041* (2013.01); *G09G 2330/021* (2013.01)

(58) Field of Classification Search
CPC .............. G06F 3/041; G09G 2330/02; G09G 2330/021
USPC ................. 345/87, 173, 211–214; 349/19
See application file for complete search history.

(56) References Cited

U.S. PATENT DOCUMENTS

| | | | | |
|---|---|---|---|---|
| 5,515,068 A * | 5/1996 | Uragami et al. | ............... | 345/3.1 |
| 8,240,326 B2 | 8/2012 | Kacik et al. | | |
| 2005/0213593 A1 * | 9/2005 | Anderson et al. | ............. | 370/419 |
| 2008/0143729 A1 * | 6/2008 | Wyatt et al. | ................... | 345/501 |
| 2009/0091559 A1 | 4/2009 | Smith | | |
| 2009/0207154 A1 * | 8/2009 | Chino | ............................ | 345/175 |
| 2010/0245338 A1 | 9/2010 | Todorovich | | |
| 2010/0277641 A1 | 11/2010 | Kato | | |
| 2011/0216048 A1 * | 9/2011 | Koyama et al. | ............... | 345/204 |
| 2011/0242116 A1 | 10/2011 | Nath | | |
| 2011/0254802 A1 * | 10/2011 | Philipp | ........................ | 345/174 |
| 2011/0267297 A1 * | 11/2011 | Yamazaki et al. | ............ | 345/173 |
| 2012/0038585 A1 * | 2/2012 | Kim | ............................ | 345/174 |
| 2012/0054379 A1 * | 3/2012 | Leung et al. | .................... | 710/23 |
| 2012/0069059 A1 * | 3/2012 | Lee | ................ | 345/690 |
| 2012/0287093 A1 * | 11/2012 | Gotoh et al. | .................. | 345/204 |
| 2013/0328797 A1 * | 12/2013 | Al-Dahle et al. | ............. | 345/173 |
| 2013/0328824 A1 * | 12/2013 | Krah et al. | ..................... | 345/174 |
| 2013/0342431 A1 * | 12/2013 | Saeedi et al. | .................... | 345/89 |
| 2014/0132585 A1 * | 5/2014 | Youn et al. | .................... | 345/212 |

\* cited by examiner

*Primary Examiner* — Joe H Cheng
(74) *Attorney, Agent, or Firm* — Fletcher Yoder PC

(57) ABSTRACT

Methods and devices employing circuitry for reducing power usage of a touch-sensitive display are provided. In one example, a method includes receiving power for a display of an electronic device. The method also includes powering a touch subsystem and a display subsystem of the display. The method includes, in a standard display mode, storing a frame of data in pixels of the display subsystem during a first period of time. The method also includes, in a low power display mode, storing a frame of data in pixels of the display subsystem during a second period of time. The second period of time is not equal to the first period of time. The method includes detecting a touch of the display via the touch subsystem between each synchronization signal of a plurality of synchronization signals received by the display.

24 Claims, 9 Drawing Sheets

DEVICES AND METHODS FOR REDUCING POWER USAGE OF A TOUCH-SENSITIVE DISPLAY

CROSS REFERENCE TO RELATED APPLICATIONS

This application is a Non-Provisional Patent Application of U.S. Provisional Patent Application No. 61/657,686, entitled "Devices and Methods for Reducing Power Usage of a Touch-Sensitive Display", filed Jun. 8, 2012, which is herein incorporated by reference.

BACKGROUND

The present disclosure relates generally to electronic devices and, more particularly, to reducing power usage of a touch-sensitive display of the electronic device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including consumer electronics such as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery powered devices or in other contexts where it is desirable to minimize power usage.

Typically, touch-sensitive LCD panels include an array of pixels for displaying images. Image data related to each pixel may be sent by a processor to the LCD panel through a driver integrated circuit (IC). The driver IC then processes the image data and transmits corresponding voltage signals to the individual pixels. The touch-sensitive LCD panels may also include touch input sensing and processing electronics such as capacitive arrays and touch controllers. Both the display panel, as well as the touch sensing electronics may add to the power consumption of the touch-sensitive LCD panel.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for reducing power usage of a touch-sensitive display. By way of example, a method includes receiving power for a display of an electronic device. The method also includes powering a touch subsystem and a display subsystem of the display. The method includes, in a standard display mode, storing a frame of data in pixels of the display subsystem during a first period of time. The method also includes, in a low power display mode, storing a frame of data in pixels of the display subsystem during a second period of time. The second period of time is not equal to the first period of time. The method includes detecting a touch of the display via the touch subsystem between each synchronization signal of a plurality of synchronization signals received by the display.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
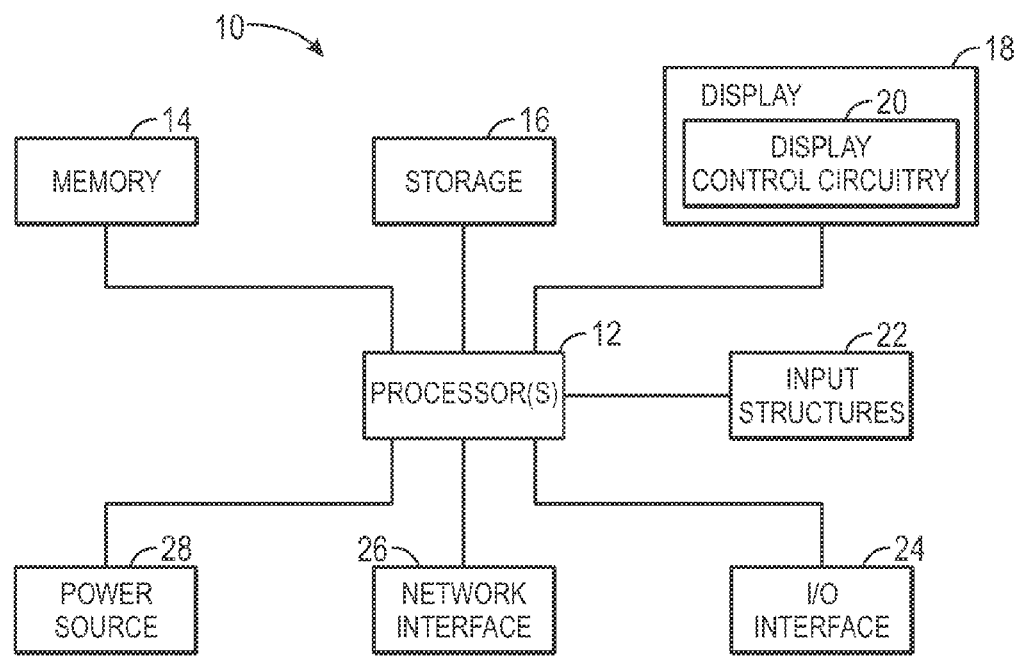
FIG. 1 is a block diagram of exemplary components of an electronic device, in accordance with present embodiments.
Figure 2:
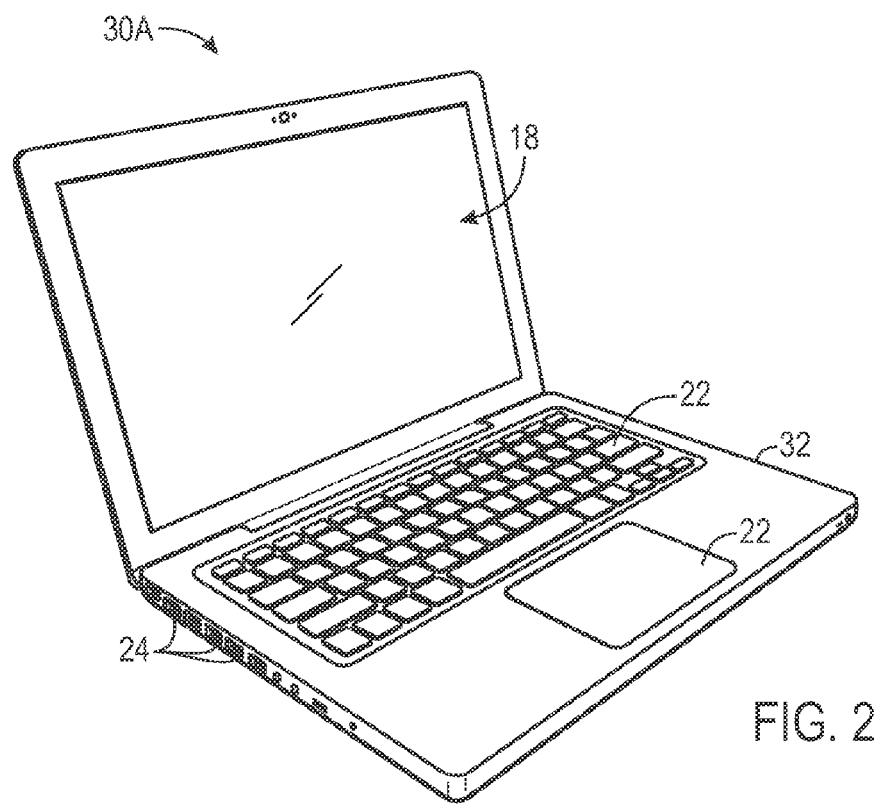
FIG. 2 is a perspective view of a notebook computer representing an embodiment of the electronic device of FIG. 1.
Figure 3:
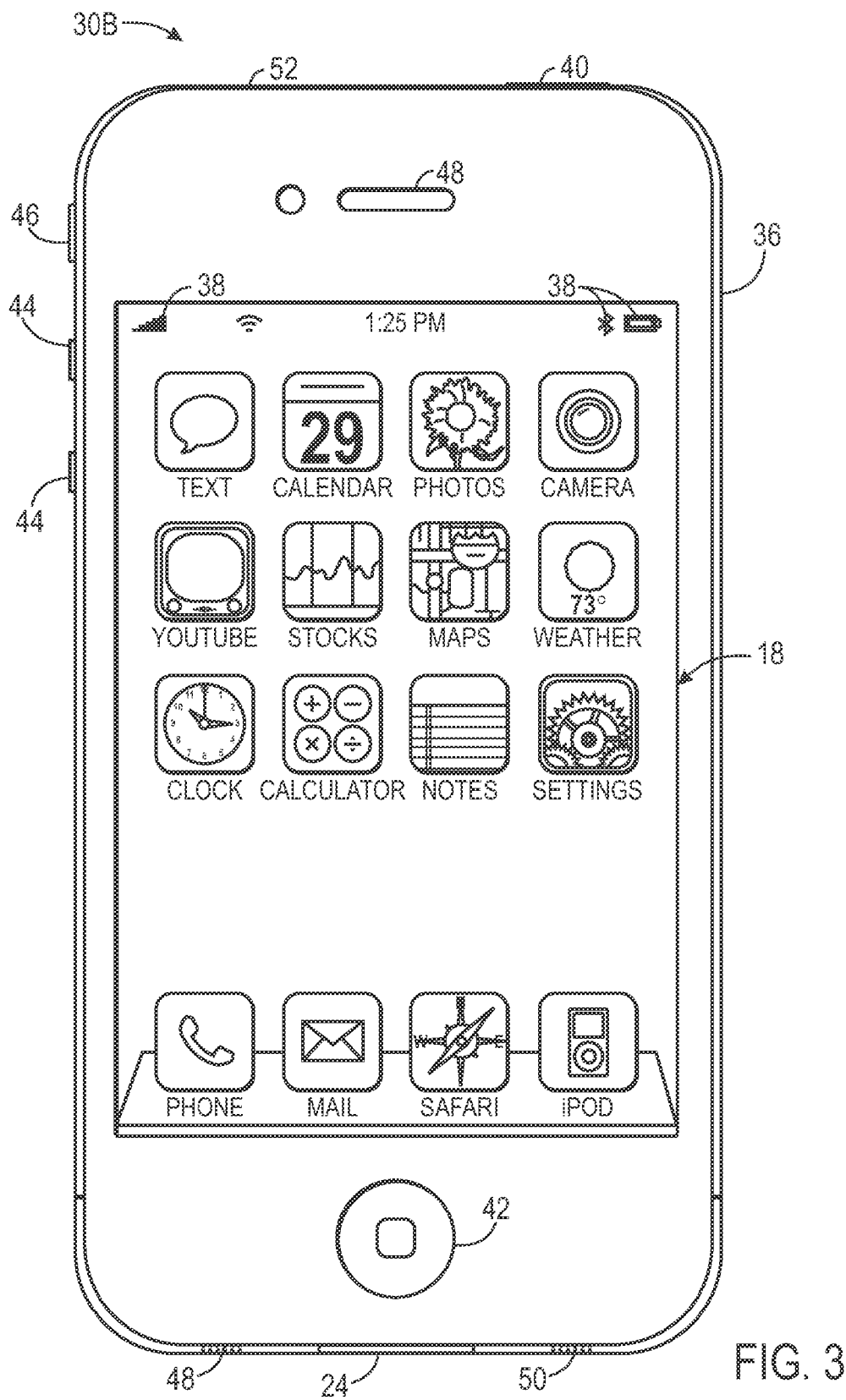
FIG. 3 is a front view of a handheld device representing another embodiment of the electronic device of FIG. 1.
Figure 4:
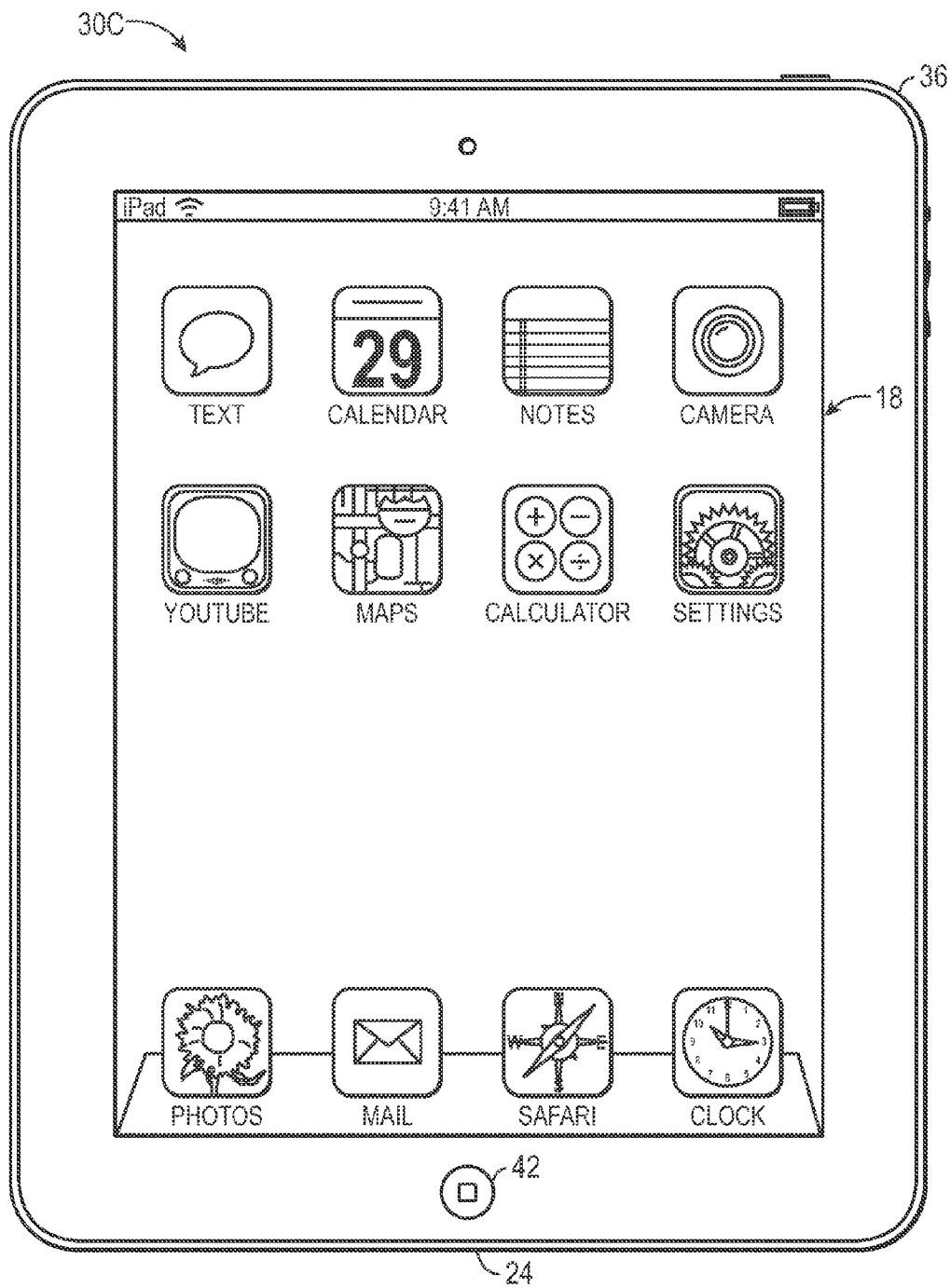
FIG. 4 is a front view of a tablet computing device representing another embodiment of the electronic device of FIG. 1.

With the foregoing in mind, a general description of suitable electronic devices that may employ touch-sensitive displays having capabilities to operate in a reduced power mode will be provided below. In particular, FIG. 1 is a block diagram depicting various components that may be present in an electronic device suitable for use with such a display. FIGS. 2, 3, and 4 respectively illustrate perspective and front views of a suitable electronic device, which may be, as illustrated, a notebook computer, handheld electronic device, or a tablet computing device.

Turning first to FIG. 1, an electronic device 10 according to an embodiment of the present disclosure may include, among other things, one or more processor(s) 12, memory 14, nonvolatile storage 16, a display 18 having display control circuitry 20 for reducing power usage in a low power display mode, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10. As will be appreciated, when a touch-sensitive display is operating in a mode where the display does not need to be updated at a high frequency or where the data for the display does not change frequently, an unnecessary amount of power may be consumed by the display. As such, embodiments of the present disclosure may be employed to decrease the power consumption of the touch-sensitive display.

By way of example, the electronic device 10 may represent a block diagram of the notebook computer depicted in FIG. 2, the handheld device depicted in FIG. 3, the tablet computing device depicted in FIG. 4, or similar devices. It should be noted that the processor(s) 12 and/or other data processing circuitry may be generally referred to herein as "data processing circuitry." This data processing circuitry may be embodied wholly or in part as software, firmware, hardware, or any combination thereof. Furthermore, the data processing circuitry may be a single contained processing module or may be incorporated wholly or partially within any of the other elements within the electronic device 10. As presented herein, the data processing circuitry may control the power consumption of the electronic display 18 by controlling a display subsystem and touch subsystem of the electronic display 18 to operate in a standard display mode, a low power display mode, or to switch between operating in one of the standard display mode and the low power display mode.

In the electronic device 10 of FIG. 1, the processor(s) 12 and/or other data processing circuitry may be operably coupled with the memory 14 and the nonvolatile memory 16 to execute instructions. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12.

The display 18 may be a touch-screen (e.g., touch-sensitive) liquid crystal display (LCD), for example, which may allow users to interact with a user interface of the electronic device 10. In some embodiments, the electronic display 18 may be a MultiTouch™ display that can detect multiple touches concurrently. For example, the display 18 may be a capacitive-touch-sensitive display capable of detecting projected capacitive touch (PCT) touch input gestures, such as a single touch, a double touch, a drag, a flick, a pinch, a rotate, a zoom, or combinations thereof. As will be described further detail, to reduce the overall power consumption of the display 18, the display 18 (e.g., the display control circuitry 20) may be configured to control the display 18 to operate in one or more of a standard display mode and a low power display mode. Specifically, the display control circuitry 20 may be configured to receive a mode signal that is used to control the frequency that image data is stored on pixels of the display 18, and thereby may be used to control various aspects relating to power consumption of the display 18.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing 32, a display 18, input structures 22, and ports of an I/O interface 24. In one embodiment, the input structures 22 (such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on the display 18. Further, the display 18 may include the display control circuitry 20 for reducing power of the display 18, such as when the display control circuitry 20 receives an indication that the display 18 should operate in a low power display mode.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, Calif. In other embodiments, the electronic device 10 may also be a tablet computing device 30C, as illustrated in FIG. 4. For example, the tablet computing device 30C may be a model of an iPad® available from Apple Inc.

The handheld device 30B may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 30B. For example, the input structure 40 may activate or deactivate the handheld device 30B, the input structure 42 may navigate a user interface to a home screen, a user-configurable application screen, and/or activate a voice-recognition feature of the handheld device 30B, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. As also noted above, to reduce the power consumption of the display 18, the display control circuitry 20 may be configured to receive a mode signal that is used to control the rate that image data is stored on pixels of the display 18, and thereby may be used to control various aspects relating to power consumption of the display 18.

Figure 5:
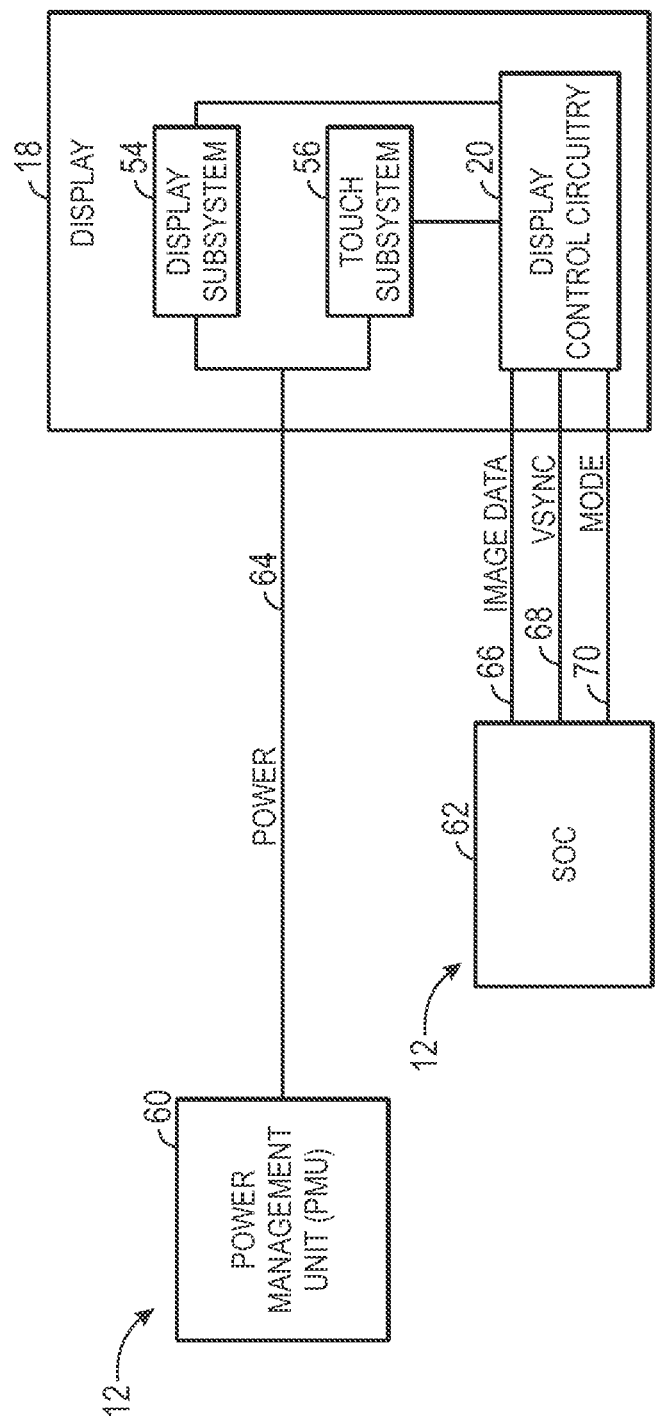
FIG. 5 is a circuit diagram of components of an electronic device, in accordance with present embodiments.

Various components of the electronic device 10 may be used to control the power consumption of the display 18. Accordingly, FIG. 5 is an embodiment of a circuit diagram of certain components of the electronic device 10 that may be used to control the power consumption of the display 18. As illustrated, the electronic device 10 may include the display 18 and various processors 12. Specifically, the display 18 includes a display subsystem 54 and a touch subsystem 56. The display subsystem 54 is configured to receive and display image data, while the touch subsystem 56 is configured to sense touches of the display 18. In the present embodiment, the display control circuitry 20 may be communicatively coupled to the display subsystem 54 and the touch subsystem 56. Although the display subsystem 54, the touch subsystem 56, and the display control circuitry 20 are illustrated separately, they are intended to indicate functionality of the display 18 as opposed to separate physical components of the display 18. Accordingly, physical components of the display 18 may be part of one or more of the display subsystem 54, the touch subsystem 56, and the display control circuitry 20.

As illustrated, the processors 12 may include a power management unit (PMU) 60 and a system on chip (SOC) 62. The PMU 60 may be used to manage the power of the electronic device 10, and may control when power is supplied to, and removed from, other components of the electronic device 10. For example, the PMU 60 may supply power 64 to the display 18. Specifically, the PMU 60 may supply power 64 to both the display subsystem 54 and the touch subsystem 56.

As illustrated, the SOC 62 provides image data 66 to the display 18. Furthermore, the SOC 62 provides a synchronization signal 68 (e.g., VSYNC) to the display 18 to cause the display 18 to refresh image data stored in pixels of the display 18. In certain embodiments, the SOC 62 may be used to control the display 18 to operate in various power modes. For example, the SOC 62 may be used to control the display 18 to operate in a standard display mode or a low power display mode. Particularly, as used herein, the "standard display mode" may refer to a display mode in which power consumed by the display subsystem 54 and the touch subsystem 56 is a combination of power used for image displaying and touch sensing under normal operating conditions. Furthermore, the "low power display mode" may refer to a display mode in which power consumed by the display subsystem 54 and the touch subsystem 56 is substantially less than the power consumed in the standard display mode.

In certain embodiments, the display 18 may transition between the standard display mode and the low power display mode via a mode signal 70 provided by the SOC 62 that controls whether the display 18 is operating in the standard display mode or the low power display mode. When controlled to operate in the standard display mode, the display 18 may operate normally. In contrast, when controlled to operate in the low power display mode, the display 18 may reduce the amount of time between synchronization signals 68 that image data is stored on pixels of the display 18 by storing data on only a portion of lines of pixels of the display 18 between each synchronization signal 68. For example, between a first synchronization signal 68 and a second synchronization signal 68 the display 18 may store data on approximately 100 lines of pixels (e.g., lines 1-100). Then, between the second synchronization signal 68 and a third synchronization signal 68 the display 18 may store data on the next 100 lines of pixels (e.g., lines 101-200). The storing of data on only a portion of lines of pixels of the display 18 may also be accomplished using a cascading method. For example, between a first synchronization signal 68 and a second synchronization signal 68 the display 18 may store data on approximately the first 100 lines of pixels (e.g., lines 1-100). Then, between the second synchronization signal 68 and a third synchronization signal 68 the display 18 may store data on the first 100 lines of pixels and the second 100 lines of pixels (e.g., lines 1-200), and so forth. In some embodiments, the display 18 may reduce the amount of time between synchronization signals 68 that image data is stored on pixels of the display 18 by storing the same data on all lines of pixels of the display 18 (e.g. a frame of data) between each synchronization signal 68. For example, between a first synchronization signal 68 and a second synchronization signal 68 the display 18 may store data representing a specific color (e.g., black, white, etc) on all lines of pixels (e.g., a frame of data). By the display 18 reducing the amount of time between synchronization signals 68 that image data is stored on pixels of the display 18, the power consumed by the display 18 is reduced. As a result, the overall power consumption of the display 18 may be reduced.

Figure 6:
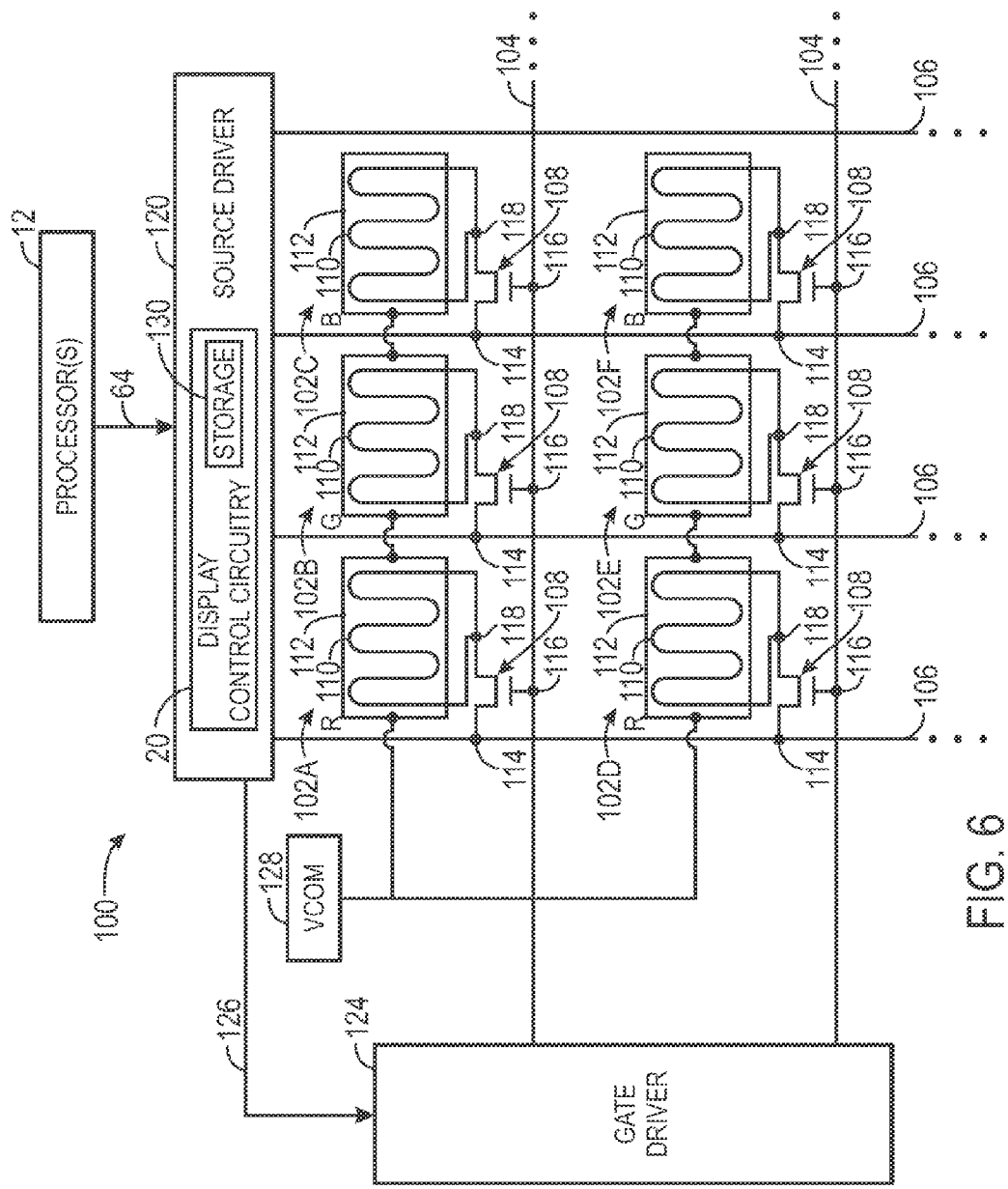
FIG. 6 is a circuit diagram illustrating display circuitry of an electronic device, in accordance with present embodiments.

Among the various components of an electronic display 18 may be a pixel array 100, as shown in FIG. 6. As illustrated, FIG. 6 generally represents a circuit diagram of circuitry of the display 18. In particular, the pixel array 100 of the display 18 may include a number of unit pixels 102 disposed in a pixel array or matrix. In such an array, each unit pixel 102 may be defined by the intersection of rows and columns, represented by gate lines 104 (also referred to as scanning lines), and source lines 106 (also referred to as data lines), respectively.

Although only six unit pixels 102, referred to individually by the reference numbers 102A-102F, respectively, are shown for purposes of simplicity, it should be understood that in an actual implementation, each source line 106 and gate line 104 may include hundreds or thousands of such unit pixels 102. Each of the unit pixels 102 may represent one of three subpixels that respectively filters only one color (e.g., red, blue, or green) of light. For purposes of the present disclosure, the terms "pixel," "subpixel," and "unit pixel" may be used largely interchangeably. Further, in certain embodiments, pixel data supplied to the pixels 102 of the display 18 may be considered a "frame" of pixel data.

In the presently illustrated embodiment, each unit pixel 102 includes a thin film transistor (TFT) 108 for switching a data signal supplied to a respective pixel electrode 110. The potential stored on the pixel electrode 110 relative to a potential of a common electrode 112, which may be shared by other pixels 102, may generate an electrical field sufficient to alter the arrangement of a liquid crystal layer of the display 18. In the depicted embodiment of FIG. 6, a source 114 of each TFT 108 may be electrically connected to a source line 106 and a gate 116 of each TFT 108 may be electrically connected to a gate line 104. A drain 118 of each TFT 108 may be electrically connected to a respective pixel electrode 110. Each TFT 108 may serve as a switching element that may be activated and deactivated for a period of time based on the respective presence or absence of a scanning or activation signal on the gate lines 104 that are applied to the gates 116 of the TFTs 108.

When activated, a TFT 108 may store the image signals (e.g., image data 66) received via the respective source line 106 as a charge upon its corresponding pixel electrode 110. As noted above, the image signals stored by the pixel electrode 110 may be used to generate an electrical field between the respective pixel electrode 110 and a common electrode 112. This electrical field may align the liquid crystal molecules within the liquid crystal layer to modulate light transmission through the pixel 102. Thus, as the electrical field changes, the amount of light passing through the pixel 102 may increase or decrease. In general, light may pass through the unit pixel 102 at an intensity corresponding to the applied voltage from the source line 106.

The display 18 also may include a source driver integrated circuit (IC) 120, which may include a processor, microcontroller, or application specific integrated circuit (ASIC), that controls the display pixel array 100 by receiving image data 66 from the processor(s) 12 and sending corresponding image signals to the unit pixels 102 of the pixel array 100. It should be understood that the source driver 120 may be a chip-on-glass (COG) component on a TFT glass substrate, a component of a display flexible printed circuit (FPC), and/or a component of a printed circuit board (PCB) that is connected to the TFT glass substrate via the display FPC. Further, the source driver 120 may include any suitable article of manufacture having one or more tangible, computer-readable media for storing instructions that may be executed by the source driver 120. In addition, the source driver 120 may include the display control circuitry 20. In some embodiments, the display control circuitry 20 is not part of the source driver 120.

The source driver 120 also may couple to a gate driver integrated circuit (IC) 124 that may activate or deactivate rows of unit pixels 102 via the gate lines 104. As such, the source driver 120 may provide timing signals 126 to the gate driver 124 to facilitate the activation/deactivation of individual rows (i.e., lines) of pixels 102. In other embodiments, timing information may be provided to the gate driver 124 in some other manner. The display 18 may include a Vcom source 128 to provide a Vcom output to the common electrodes 112. In some embodiments, the Vcom source 128 may supply a different Vcom to different common electrodes 112 at different times. In other embodiments, the common electrodes 112 all may be maintained at the same potential (e.g., a ground potential) while the display 18 may be on. In certain embodiments, as will be further appreciated, the gate driver IC 124 may be configured to activate or deactivate individual rows (i.e., lines) of pixels 102 according to the mode of operation the display 18. For example, in the standard operating mode, the gate driver IC 124 may serially (i.e., one line of pixels 102 per time period between synchronization signals 68) activate individual rows (i.e., lines) of pixels 102. On the other hand, in the low power display mode, the gate driver IC 124 may concurrently activate all of the individual rows of pixels 102 as a method to reduce power consumption of the display 18.

In certain embodiments, the display control circuitry 20 may store instructions in a storage device 130. The instructions may be used to control the display 18 to operate in one of the standard display mode, the low power display mode, or to switch between the standard display mode and the low power display mode. Such instructions may be based on the receipt of the mode signal 70, as described above. As may be appreciated, the storage device 130 may be any suitable article of manufacture having a tangible, computer-readable media for storing instructions for the display 18. For example, the storage device 130 may be an EEPROM device. It should be noted that the display 18 may receive and detect touch inputs during the standard display mode and the low power display mode.

Figure 7:
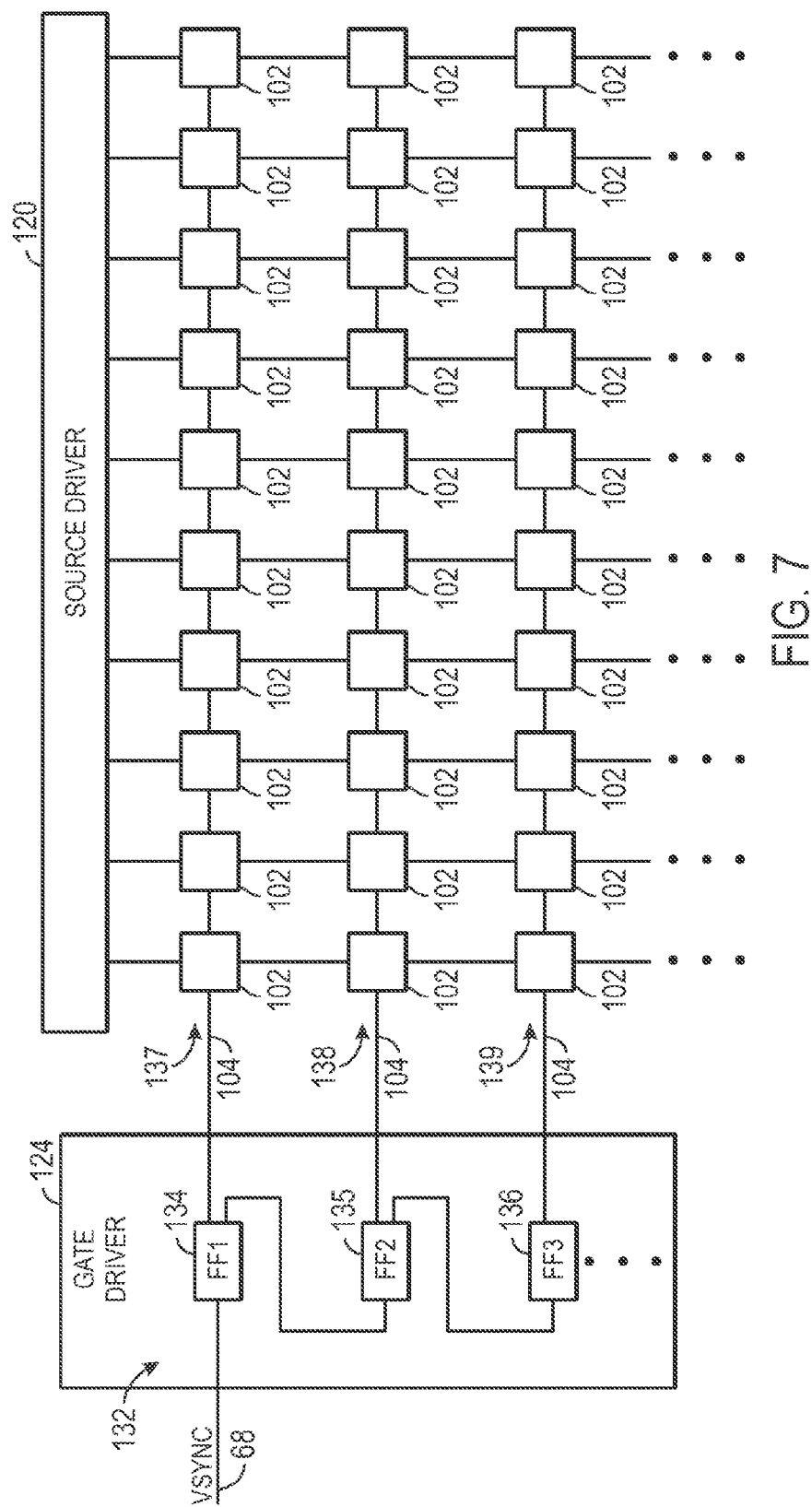
FIG. 7 is a detailed circuit diagram illustrating activation of lines of pixels using a register, in accordance with present embodiments.

As discussed above, the display 18 may be configured to activate only a portion of the lines of pixels 102 of the display 18 between each synchronization signal 68. Furthermore, the display 18 may also be configured to activate all of the lines of pixels 102 of the display 18 between each synchronization signal 68. FIG. 7 is a detailed circuit diagram illustrating activation of lines of pixels 102 using a shift register 132 that is part of the gate driver 124. The shift register 132 includes a latches 134, 135, and 136 (e.g., flip flops, clock edge-triggered devices). The latches 134, 135, and 136 are individually labeled FF1, FF2, and FF3, respectively. The latch FF1 134 is coupled to a gate line 104 and configured to provide an activation signal to pixels 102 in a first row 137 of pixels 102. Moreover, the latch FF2 135 is coupled to a gate line 104 and configured to provide an activation signal to pixels 102 in a second row 138 of pixels 102. Furthermore, the latch FF3 136 is coupled to a gate line 104 and configured to provide an activation signal to pixels 102 in a third row 139 of pixels 102. As may be appreciated, the shift register 132 may include additional latches for each row of pixels 102 of the display 18.

In certain embodiments, the latches 134, 135, and 136 may be configured so that each of the latches 134, 135, and 136 activate a row of pixels 102 at the same time so that image data may be stored in all pixels 102 of the display 18 at the same time. Accordingly, the time to store data on the pixels 102 the display 18 may be substantially reduced compared to storing data on the pixels 102 of the display 18 one row at a time. Thus, between each synchronization signal 68, less time is spent performing a data scan (e.g., storing data in pixels 102) thereby conserving power of the display 18. As may be appreciated, this type of situation may work well when data representing the same color is stored on all pixels 102 of the display 18.

Furthermore, in certain embodiments, the latches 134, 135, and 136 may be configured so that initially only a portion of the latches 134, 135, and 136 activate a row of pixels 102 between each synchronization signal 68. However, the latches 134, 135, and 136 may have a cascading effect so that after a certain number of synchronization signals 68 (e.g., the number of rows divided by the number of times rows are activated between synchronization signals 68), all of the rows of pixels 102 will be activated between each synchronization signal 68. However, in this low power display mode, the rows of pixels 102 will be activated for a limited time period as compared to a standard display mode.

For example, in a display 18 having three rows of pixels 102, as illustrated, the display 18 may receive a first synchronization signal 68 and, thereafter, during a first time period may only activate the first row 137 of pixels 102 so that image data may be stored on the first row 137 of pixels 102. In such an embodiment, the total number of rows of the display 18 is three and the number of times rows are activated between synchronization signals 68 is one. Therefore, after the third synchronization signal 68 all of the rows of pixels 102 will be activated between each synchronization signal 68. Accordingly, the display 18 may receive a second synchronization signal 68 and, thereafter, during a second time period may again activate the first row 137 of pixels 102 and because of the operation of the latch 134 may also activate the second row 138 of pixels 102 so that image data may be stored again on the first row 137 of pixels 102 and also on the second row 138 of pixels 102. Moreover, the display 18 may receive a third synchronization signal 68 and, thereafter, during a third time period may again activate the first row 137 of pixels 102 and the second row 138 of pixels 102 and because of the operation of the latches 134 and 135 may also activate the third row 138 of pixels 102 so that image data may be stored again on the first row 137 of pixels 102 and the second row 138 of pixels 102 and also on the third row 139 of pixels 102. After additional synchronization signals 68 image data may be stored on the first row 137 of pixels 102, the second row 138 of pixels 102, and the third row 139 of pixels 102. However, the image data is stored in the pixels 102 in less time between synchronization signals 68 (e.g., one third of the time) than in a standard display mode where every row of pixels is sequentially activated between each synchronization signal 68, thereby reducing power of the display.

This may be further illustrated by an example including a greater number of rows of pixels 102. For example, in a display 18 having one thousand rows of pixels 102, the display 18 may receive a first synchronization signal 68 and, thereafter, during a first time period may only activate the first one hundred rows of pixels 102 (e.g., one at a time) so that image data may be stored on the first one hundred rows of pixels 102. In such an embodiment, the total number of rows of the display 18 is one thousand and the number of times rows are activated between synchronization signals 68 is one hundred. Therefore, after the tenth synchronization signal 68 all of the rows of pixels 102 will be activated between each synchronization signal 68. Accordingly, the display 18 may receive a second synchronization signal 68 and, thereafter, during a second time period may again activate the first one hundred rows of pixels 102 and because of the operation of the shift register 132 (e.g., via a latch from the one hundredth row) may also activate the second one hundred rows of pixels 102 so that image data may be stored again on the first one hundred rows of pixels 102 and also on the second one hundred rows of pixels 102. Moreover, the display 18 may receive a third synchronization signal 68 and, thereafter, during a third time period may again activate the first one hundred rows of pixels 102 and the second one hundred rows of pixels 102 and because of the operation of the shift register 132 (e.g., via a latch from the one hundredth row and a latch from the two hundredth row) may also activate the third one hundred rows of pixels 102 so that image data may be stored again on the first one hundred rows of pixels 102 and the second one hundred rows of pixels 102 and also on the third one hundred rows of pixels 102. After additional synchronization signals 68 image data may be stored on the first one hundred rows of pixels 102, the second one hundred rows of pixels 102, and the third one hundred rows of pixels 102. However, the image data is stored in the pixels 102 in less time between synchronization signals 68 (e.g., one tenth of the time as one hundred activation signals are sequentially activated between each synchronization signal 68) than in a standard display mode where every row of pixels is sequentially activated between each synchronization signal 68. Accordingly, the time to store data on the pixels 102 the display 18 may be substantially reduced compared to storing data on the pixels 102 of the display 18 one row at a time. Again, as may be appreciated, this type of situation may work well when data representing the same color is stored on all pixels 102 of the display 18. Such an embodiment is explained in greater detail below in relation to FIG. 10.

Figure 8:
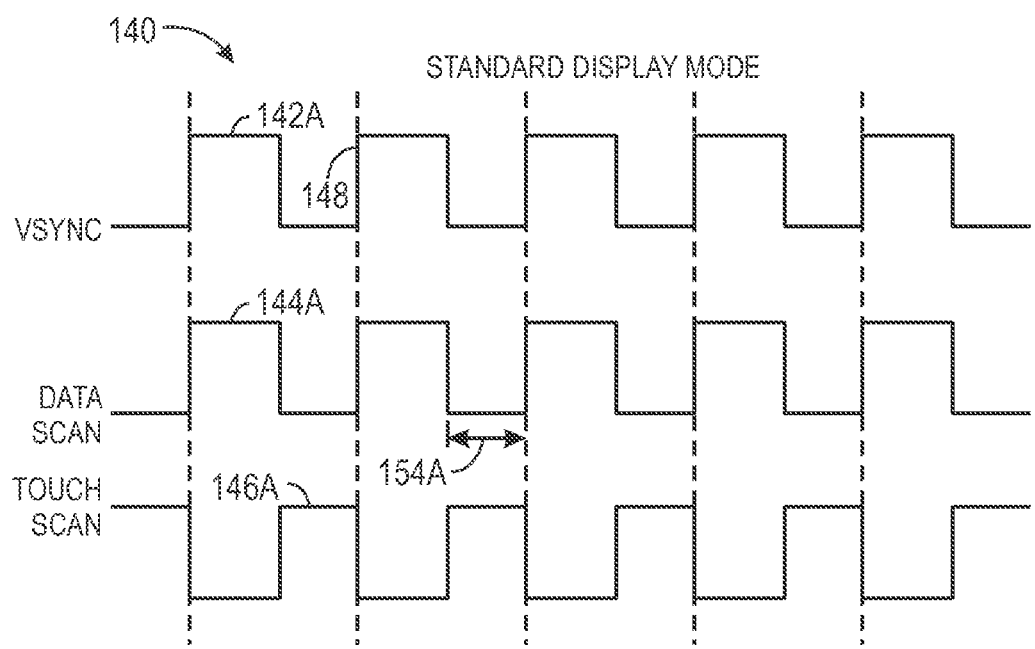
FIG. 8 is a timing diagram illustrating timing of data scans and touch scans in a standard display mode of a display, in accordance with present embodiments.

FIG. 8 illustrates a timing diagram 140 that shows the timing of a synchronization signal 142A (e.g., VSYNC), data scan 144A, and a touch scan 146A (e.g., a time period where the display 18 scans for a touch) in the standard display mode. In certain embodiments, the synchronization signal 142A may include rising edges 148, which may each be detected by the display 18 to identify when a data scan 144A should begin. The logical high portions of the data scan 144A may represent time periods where a frame of data is stored in pixels 102 of the display 18. In the illustrated embodiment, the rising edges 148 of the synchronization signals 142A may occur at a standard rate (e.g., approximately 60 Hz). Consequentially, the data scans 144A may also occur at the standard rate. As may be appreciated, the data scans 144A may include a blanking period 154A (e.g., a time period where data is not stored in pixels 102 of the display 18), which may be represented as the logic low portions between the logical high portions of the data scans 144A. For example, in the standard display mode, the blanking periods 154A may be approximately 5 ms, 10 ms, 16 ms, 32 ms, and so forth.

In certain embodiments, for example, blanking periods 154A may be proportional to the refresh rate of the display 18 operating in the standard display mode (e.g., at a refresh rate of approximately 60 Hz, the time blanking periods 154A may be approximately 16 ms). In other embodiments, for example, the blanking periods 154A may be substantially the time it may take for the display 18 to store a frame of pixel data in the pixels 102 of the display 18 (e.g., the time that the data scan 144A is logically high). In the present embodiment, the touch scan 146A is controlled to be logically high during the blanking periods 154A, such that touch inputs on the display 18 may be sensed between the times that the display 18 is refreshed with frames of pixel data. In certain embodiments, the touch scan 146A may be controlled to be logically high during a front porch portion of the blanking periods 154A.

Figure 9:
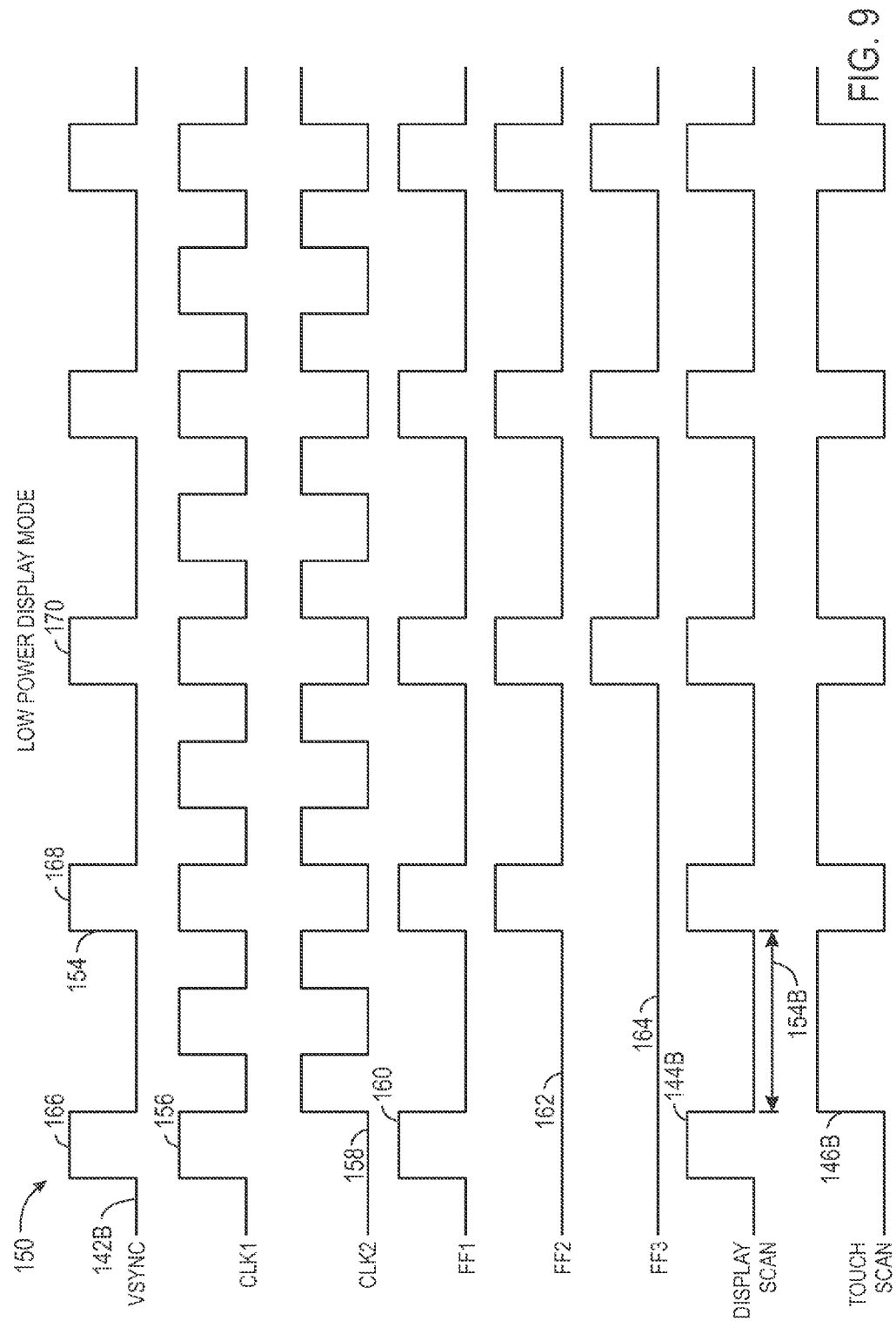
FIG. 9 is a timing diagram illustrating timing of data scans and touch scans in a low power display mode, in accordance with present embodiments.

In certain embodiments, the duration of the logical high portions of the data scan 144A (e.g., the time period when data is stored on pixels 102 between each synchronization signal 68) may be reduced so that the data scan 144A may include longer (e.g., extended) blanking periods 154A to reduce power consumption of the display 18. For example, FIG. 9 illustrates an embodiment of a timing diagram 150 that shows the timing of a synchronization signal 142B, data scan 144B, and a touch scan 146B in the low power display mode. Moreover, the synchronization signal 142B is provided to the display 18 at that the same rate that is provided in the standard display mode. As depicted, the logical high portions of the data scan 144B are delayed by the blanking periods 154B. Therefore, the length of time of the logic high portions of the touch scan 146B is increased up to approximately the time of the blanking periods 154B. For example, if the blanking periods 154B were approximately 50 ms, the touch scan 146A may be driven to logical highs during for approximately 50 ms. Thus, in the low power display mode, the display 18 may receive and/or store frames of pixel data at a reduced rate. Accordingly, power consumed by receiving and/or storing pixel data may be reduced. Therefore, the overall power consumption of the display 18 may be reduced (e.g., while the display 18 is in a primarily touch-sensing mode).

The blanking periods 154B are increased in the present embodiment because the logical high portions of the display scan 144B are decreased. Accordingly, the signals CLK1 156, CLK2 158, FF1 160, FF2 162, and FF3 164 are used to illustrate one embodiment for decreasing the logical high portions of the display scan 144B. The complimentary clock signals CLK1 156 and CLK2 158 may be used in various embodiments for controlling the operation of the shift register 132. The latch signals FF1 160, FF2 162, and FF3 164 indicate activation signals provided by the shift register 132 to activate individual rows of pixels 102. In such an embodiment, the total number of rows of the display 18 is three and the number of times rows are activated between synchronization signals 142B is one. Therefore, after the third synchronization signal 142B all of the rows of pixels 102 will be activated between each synchronization signal 142B, as illustrated. When a first logic high 166 of the synchronization signal 142B is received, FF1 160 transitions to a logic high; however, FF2 162 and FF3 164 remain a logic low. Furthermore, when a second logic high 168 of the synchronization signal 142B is received, FF1 160 and FF2 162 transition to a logic high; however, FF3 164 remains a logic low. Moreover, when a third logic high 170 of the synchronization signal 142B is received, FF1 160, FF2 162, and FF3 164 all transition to a logic high. On all subsequent logic highs, FF1 160, FF2 162, and FF3 164 all transition to a logic high so that all rows of pixels 102 of the display 18 have data stored on them during the logic high portions of the display scan 144B. As may be appreciated, the image data is stored in the pixels 102 in less time between logic high synchronization signals 142B (e.g., one third of the time) than in a standard display mode where every row of pixels is sequentially activated between each synchronization signal 142B, thereby reducing power of the display.

Figure 10:
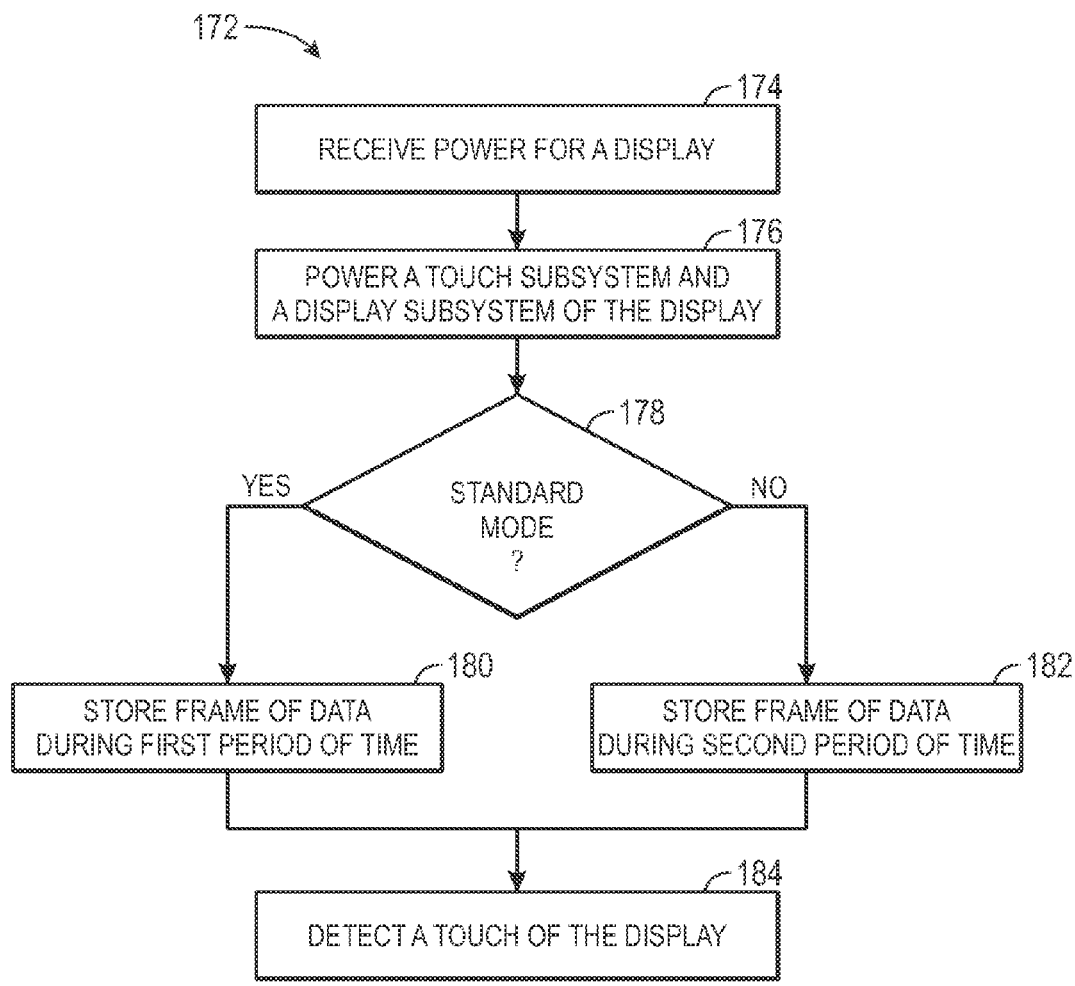
FIG. 10 is a flowchart describing a method of operating the electronic device of FIG. 1 in a standard display mode and a low power display mode, in accordance with present embodiments.

Turning now to FIG. 10, a flowchart describing a method 172 of operating the electronic device of FIG. 1 in a standard display mode and a low power display mode is illustrated. The method 172 may include receiving power for the display 18 of the electronic device 10 (e.g., from the PMU 60) (block 174). The method 172 may also include powering the touch subsystem 56 and the display subsystem 54 of the display 18 (block 176). The display 18 determines whether it should be in the standard display mode or the low power display mode (block 178). In certain embodiments, the display 18 receives a signal (e.g., mode signal 70) indicating for the display 18 to transition between the standard display mode and the low power display mode. If the display 18 is operating in the standard display mode, the display 18 may store a frame of data in pixels 102 of the display subsystem 54 during a first period of time (e.g., display scan 144A) (block 180). In contrast, if the display 18 is operating in the low power display mode, the display 18 may store a frame of data in pixels 102 during a second period of time (e.g., display scan 144B) (block 182). The second period of time (e.g., duration) is not equal to the first period of time (e.g., duration). In some embodiments, the second period of time is less than the first period of time. In the standard display mode and the low power display mode, a touch of the display 18 may be detected by (e.g., via) the touch subsystem 56 between each synchronization signal of a plurality of synchronization signals received by the display (block 184). Detecting a touch may include detecting multiple touches and/or performing one or more touch scans. As may be appreciated, synchronization signals may be sent to the display 18 at a frequency (e.g., refresh rate) that is the same for the standard display mode and the low power display mode (e.g., 60 Hz).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
receiving power for a display of an electronic device;
powering a touch subsystem and a display subsystem of the display;
in a standard display mode, storing a frame of data in pixels of the display subsystem during a first period of time; and
in a low power display mode:
storing a frame of data in pixels of the display subsystem during a second period of time, wherein the second period of time is not equal to the first period of time, wherein storing the frame of data in pixels of the display subsystem during the second period of time comprises storing data in a first set of lines of pixels of the display between a first synchronization signal and a second synchronization signal of a plurality of synchronization signals received by the display, wherein the first set of lines of pixels represents fewer than a total number of lines of pixels of the display subsystem, and wherein the first synchronization signal and the second synchronization signal are consecutive; and
detecting a touch of the display via the touch subsystem between each synchronization signal of the plurality of synchronization signals received by the display.

2. The method of claim 1, wherein the second period of time is less than the first period of time.

3. The method of claim 1, wherein the standard display mode comprises detecting a touch of the display via the touch subsystem between each synchronization signal of the plurality of synchronization signals.

4. The method of claim 3, wherein the plurality of synchronization signals is sent to the display at a frequency that is substantially the same for the standard display mode and the low power display mode.

5. The method of claim 1, comprising receiving the plurality of synchronization signals at a rate of approximately 60 Hz.

6. The method of claim 1, wherein storing the frame of data in pixels of the display subsystem during the second period of time comprises storing the frame of data in multiple lines of pixels of the display subsystem at the same time.

7. The method of claim 1, wherein storing the frame of data in pixels of the display subsystem during the second period of time comprises storing the frame of data in all pixels of the display subsystem at the same time.

8. The method of claim 1, wherein storing the frame of data in pixels of the display subsystem during the second period of time comprises storing data in the first set of lines of pixels and a second set of lines of pixels between the second synchronization signal and a third synchronization signal of the plurality of synchronization signals, and wherein the second synchronization signal and the third synchronization signal are consecutive.

9. The method of claim 1, comprising receiving a signal indicating for the display to transition between the standard display mode and the low power display mode.

10. A method comprising:
receiving power for a display of an electronic device;
powering a touch subsystem and a display subsystem of the display;
in a standard display mode, storing a frame of data in pixels of the display subsystem during a first period of time; and
in a low power display mode:
storing a frame of data in pixels of the display subsystem during a second period of time, wherein the second period of time is not equal to the first period of time, and wherein storing the frame of data in pixels of the display subsystem during the second period of time comprises storing data representative of a single color on all pixels of the display subsystem; and
detecting a touch of the display via the touch subsystem between each synchronization signal of a plurality of synchronization signals received by the display.

11. An electronic display comprising:
a display subsystem comprising a plurality of pixels configured to display image data, the display subsystem configured to:
in a standard display mode, store a frame of data in pixels of the display subsystem during a first duration; and
in a low power display mode, store a frame of data in pixels of the display subsystem during a second duration, wherein storing the frame of data in pixels of the display subsystem during the second duration comprises storing data in a first set of rows of pixels of the display subsystem between a first synchronization signal and a second synchronization signal of a plurality of synchronization signals received by the display subsystem, wherein the first set of rows of pixels is less than a total number of rows of pixels of the display subsystem, wherein the first synchronization signal and the second synchronization signal are consecutive, and wherein the second duration is less than the first duration; and
a touch subsystem configured to sense a touch of the display between each synchronization signal of the plurality of synchronization signals received by the display subsystem.

12. The electronic display of claim 11, wherein the display subsystem comprises a shift register having a plurality of latches and each of the plurality of latches is configured to activate a row of pixels.

13. The electronic display of claim 12, wherein, in the low power display mode, the display subsystem is configured to activate more than one row of pixels at the same time using the shift register.

14. An electronic device comprising:
an electronic display configured to:
in a standard display mode, store a frame of pixel data during a first period of time;
in a low power display mode, store a frame of pixel data during a second period of time, wherein storing the frame of data during the second period of time comprises storing data in a first line of pixels of a plurality of lines of pixels of the electronic display between a first synchronization signal and a second synchronization signal provided to the electronic display, wherein the first synchronization signal and the second synchronization signal are consecutive, and wherein the second period of time is less than the first period of time; and
in the standard display mode and the low power display mode, detect a touch of the electronic display between the first synchronization signal and the second synchronization signal; and
a processor electrically coupled to the electronic display and configured to provide image data to the electronic display.

15. The electronic device of claim 14, wherein the second period of time is less than one half of the first period of time.

16. A method comprising:
receiving power for a display of an electronic device;
powering a touch subsystem and a display subsystem of the display;
in a standard display mode, receiving a first plurality of synchronization signals, wherein a frame of data is stored on pixels of the display subsystem between each synchronization signal of the first plurality of synchronization signals; and
in a low power display mode:
receiving a second plurality of synchronization signals, wherein a portion of a frame of data is stored on pixels of the display subsystem between each synchronization signal of the second plurality of synchronization signals, wherein the portion of the frame of data is stored in a first plurality of rows of pixels of the display between each synchronization signal of the second plurality of synchronization signals, wherein the first plurality of rows of pixels comprises a subset of a total number of rows of pixels of the display, and wherein each synchronization signal of the second plurality of synchronization signals are consecutive; and
detecting a touch of the display via the touch subsystem between each of the synchronization signals of the second plurality of synchronization signals.

17. The method of claim 16, wherein detecting the touch of the display comprises detecting a first touch and a second touch.

18. The method of claim 16, wherein detecting the touch of the display comprises performing a touch scan.

19. The method of claim 16, wherein detecting the touch of the display comprises performing a plurality of touch scans.

20. The method of claim 16, wherein the standard display mode comprises detecting a touch of the display via the touch subsystem between each synchronization signal of the first plurality of synchronization signals.

21. The method of claim 16, wherein the portion of the frame of data is stored on pixels of the display subsystem before detecting the touch of the display.

22. The method of claim 16, wherein the first plurality of synchronization signals and the second plurality of synchronization signals are received at approximately the same rate.

23. A method comprising:
receiving a first signal indicating for a display to transition to a low power display mode;
storing data on pixels of the display during a first period of time, wherein storing the frame of data in pixels of the display during the first period of time comprises storing data in a first set of lines of pixels of the display between a first synchronization signal and a second synchronization signal of a plurality of synchronization signals received by the display, wherein the first set of lines of pixels is less than a total number of lines of pixels of the display, and wherein the first synchronization signal and the second synchronization signal are consecutive; and sensing a touch of the display after the first period of time, wherein the first period of time is less than a second period of time, and wherein the second period of time corresponds to an amount of time used for storing data on pixels of the display during a standard display mode.

24. The method of claim 23, comprising receiving a second signal indicating for the display to transition to the standard display mode and storing data on pixels of the display during the second period of time.

\* \* \* \* \*